July 13, 1965 H. S. POLIN 3,193,912
ELECTRO-STATIC PARTICLE COLLECTING DEVICE
Original Filed March 9, 1954 2 Sheets-Sheet 1

INVENTOR
Herbert S. Polin
BY
ATTORNEYS

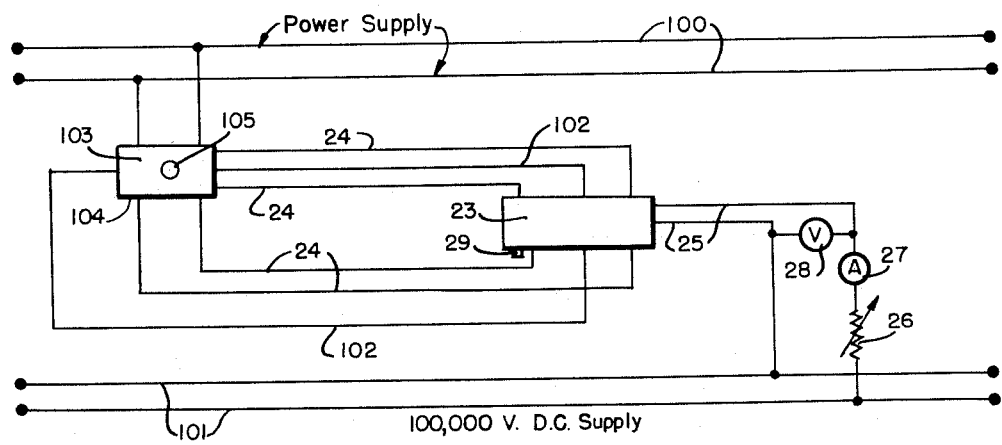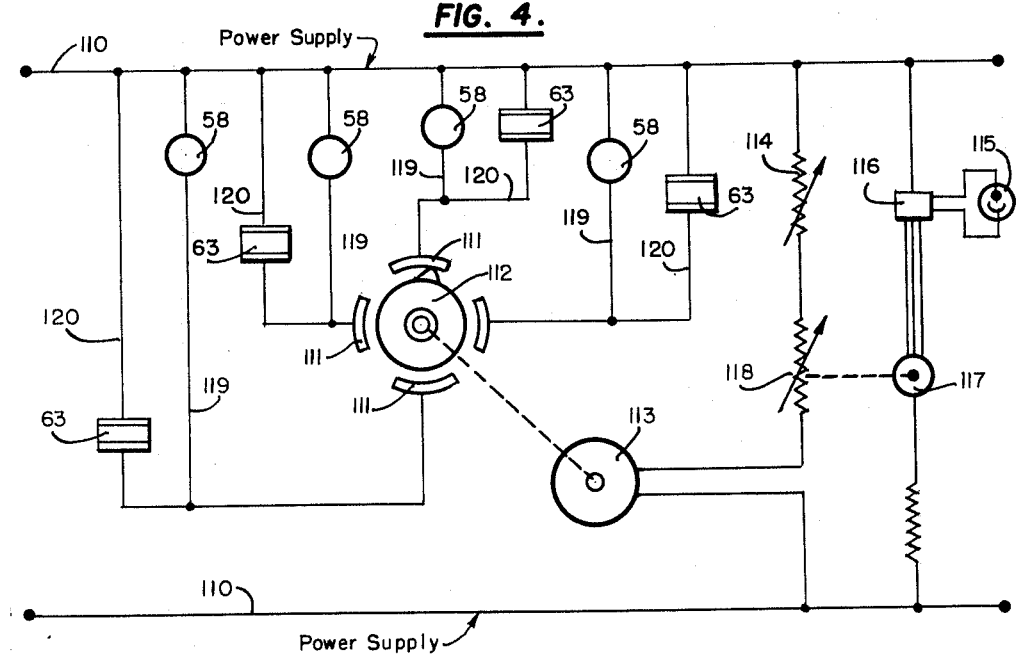

United States Patent Office 3,193,912
Patented July 13, 1965

3,193,912
ELECTRO-STATIC PARTICLE COLLECTING DEVICE
Herbert S. Polin, % Laboratoire de Recherches Physiques, Veyrier, Geneva, Switzerland
Continuation of application Ser. No. 415,100, Mar. 9, 1954. This application Jan. 4, 1963, Ser. No. 249,412
4 Claims. (Cl. 29—155.5)

The present application is a continuation of my copending application Serial No. 415,100, filed March 9, 1954, for Electro-Static Particle Collecting Device, now abandoned.

The present invention relates to the preparation of a material having a permanent electrostatic charge and to its application in the collection of fine particles moving in an air stream or the like.

It is an object of the invention to provide an electret of material free from binder which dilutes the charge effect.

It is an object of the invention to provide an electret in which the alignment of molecules is achieved on the molecular lever and individual molecules are oriented to an extent exceeding eighty percent. The electret material may also comprise simple crystal lattices made up of as many as eight or ten molecules which are aligned by an impressed charge.

It is one broad purpose of the invention to describe a method for the preparation of a permanent type of electret from classes of materials not heretofore recognized as adaptable to such application.

It is a further object of the invention to described the application of electrets made according to the process of the invention to one problem in industry, that of dust collection, as an illustrative example of the many possible uses of the invention.

The term electret is attributed to Oliver Heaviside. The journals of physics record a periodic interest in the investigation of a phenomenon dating from the experiments of Eguchi in 1925 to the current reports of Gutmann, Gemant and Gross (see: Gutman, F. Review of Modern Physics, volume 20, No. 3, 1948; Eguchi, M., Phil. Magazine, volume 49, p. 178, 1925; Gross, B., Jour. Chem. Physics, volume 17, No. 10, 1949; German, A., Physics Today, volume 2, No. 3, 1949). In each instance, with slight modifications in technique and material, the investigators prepared electrets of waxes of the carnauba type, or from mixtures of wax-like substances. Electrets are formed when a wax or mixture of waxes normally solid at room temperature is heated to melting and allowed to cool or solidify in a strong electric field.

I have found that many substances other than waxes or the like may be caused to accept electrification and to yield a solid with a "frozen-in" charge. The substances with which the present invention is particularly concerned comprise materials having a dielectric constant below 10. The magnitude of the charge is determined in part by the magnitude of the applied direct current voltage during solidification and in part by the dielectric character of the material employed. I have found that a substance need not be fluid or experience a complete change of state in order to accept electrification as described in the literature, but that this can be accomplished by causing or permitting the material to pass from a state of an electro-conductive to a substantially non-conductive material, for example, as by evaporation of a saturating conductive medium while the whole is under a high direct-current potential. In this way I have formed electrets of various plastic substances and of paper, in which water, water vapor or the impurities therein, or a solvent, established the initial conductivity.

Of particular importance is the discovery that substances such as beryl, quartz, glass, the titanates, zircongermanium, silicon, and the like, which fuse only at high temperatures, need not be brought to the fusion point, but may be electrified at somewhat lower temperatures. In this instance the change in electro-conductivity accompanying the formation of the electret is provided by the gradual reduction of a high temperature applied while the element is maintained between electrodes connected to a high direct-current voltage source.

It has been observed that maximum charge persistence and potential is accomplished in the aforesaid process when heating of the composition is carried to a point just below the point of transition of change of state from the solid to the liquid. This transition point has a thermal range of a few degrees, varying from material to material, and may be designated as the temperature just below that of mass fusion, with the material beginning to flow but not yet a complete liqueous mass.

While the theory to account for the unexpected and advantageous result is not to be considered limiting, it is suggested that the benefit derives from the suppression of thermal discontinuities within a completely liquefied compound in which ionized domains compete in the electrical charge transfer with the imposed electrical stress which the process demands be dominant. When the material, be it of low melting point composition such as waxes or other organic substances, or of high melting point materials of inorganic classification, is brought to its transition state at elevated temperature, it passes through a range of instability undefined by either its prior or subsequent phase. Within this range I have found that the application of the orienting electrical stress has maximum effect and indeed dominates any intra mass ionization phenomena.

For purposes of better defining this range of transition temperature, we have specified the operative process temperatures as "just below the point of fusion" of the mass Reference is made to the Handbook of Physics, McGraw Hill Book Company, Inc., 1958, part 4, chapter 1, pages 5 and 6, for discussion of the orientation of molecules under high voltages stress.

According to Gemant's terminology, the electrification of a substance capable of maintaining a permanent charge is accompanied by a phenomenon of a dual charge character. If the measured charge on the face of an electret is of the same polarity as the charging electrode adjacent to that face, this charge is called a homocharge; if the electrodes and faces are of opposite sign, the charge is termed a heterocharge. In the instance of wax electrets it is found that with time the heterocharge gradually disappears and a permanent homocharge supplants it.

I have found that by selection of the material and by the steps to be described, one can produce high fusion point electrets with a permanent charge, generally of the homocharge character. The controlling conditions require the suppression of discontinuous characteristics such as will produce non-uniformly polarized domains between which a space charge may flow and dissipate the overall polarization. In the instance of materials not brought to fusion during electrification, high pressures are of assistance in some cases in producing internal electrical homogeneity. However, high pressure is in any instance an advantageous production adjunct.

I have been successful in the preparation of electrets from a number of materials not heretofore recognized as being capable of electrification of the type described. The descriptions of process steps and apparatus set forth below are by way of illustration and are not be considered as limiting. The invention resides in the discovery of those factors which control the physics of electret formation, the several electrets per se, and the means and method by which they are produced as set forth in generic terms in the appending claims, together with those various applications of the electret forming a part of this invention in the field of collection of fine particles, all of which will be covered by the said claims.

In the drawings, like numbers refer to like parts throughout.

FIGURE 1 is an elevation in section of one form of the device for making electrets according to the invention.

FIGURE 2 is an elevation in section illustrative of one application of electrets to fine particle collection.

FIGURE 3 is a diagrammatic control circuit for the apparatus in FIGURE 1.

FIGURE 4 is a diagrammatic control circuit for the apparatus of FIGURE 2.

The mechanism of FIGURE 1 for the preparation of electrets of fused quartz is illustrative of the technique employed for the variety of substance named herein as being suitable materials for the manufacture of electrets employable in equipment to be described. As a class, those materials found in the category classified as Ferrites or "Ferro-electric" substances yield excellent electrets by the process outlined below. Reference is made to Webster's New International Dictionary, second edition, unabridged, published in 1947 by Merriam Company, page 935, which defines a ferrite as, Any of several compounds which may be regarded as metallic derivatives of the ferric hydroxide $Fe_2O_2(OH)_2$, analogous to aluminates; as, Franklinite is zinc ferrite.

and to the International Dictionary of Physics and Electronics, published in 1956 by D. Van Nostrand Co. Inc., at page 331, which defines ferrite as, The inorganic salts of the formula $MFe_2O_4$, where M represents a bivalent metal.

A carbon crucible 10 having top and bottom portions 16 and 17 serves as a heating vessel for a circular disc 11 of fused quartz which in the figure shown, is about eight centimeters in diameter and one centimeter thick. Crucible bottom portion 17 should have a depression 12 of a dimension to receive the quartz disc 11, allowing 0.5 centimeter space between the periphery of disc 11 and the side wall of the carbon crucible at 13. Because the carbon crucible 10 is also a high voltage electrode, the inner bottom surface 14 upon which the quartz disc 11 rests should be polished for optical face intimacy between the two conducting surfaces 14 and 15 to prevent spray discharge points. The depression 12 in the carbon permits the quartz disc 11 to rest about one centimeter below the surface 18 of bottom portion 17. Top part 16 of block carbon, the contacting surface 19 of which is highly polished, is slightly smaller in diameter than the quartz disc 11. Both carbon units 16 and 17 of crucible 10 are heated by an "integral arc" and are thermostatically controlled by thermocouple 20 to maintain identical temperatures during the rising thermal cycle. A high voltage electrical connection is provided by suitable terminals 21 and 22, one in each carbon element 16 and 17. The unit is placed in a chamber 23, capable of being evacuated, which contains provision for the electrical connections 24 of power for the arc heating and connections 25 for the high voltage direct current electret activating voltage. The latter voltage source is equipped with a rheostat 26, milliammeter 27 and voltmeter 28, permitting control over the range of 0–100 kv. and 0–250 milliamperes.

FIGURE 3 shows one form of timing control circuit for the apparatus of FIGURE 1. Power supply 100 is connected to timer-control unit 104 from which power supply leads 24 go to carbons 31–34. Temperature control is maintained by signals received through thermocouple leads 102. Unit 104 contains a clock mechanism which allows for an initial period for crucible 10 to achieve working temperature and a fifteen-minute working run after which unit 104 disconnects supply 100 and allows crucible 10 to cool. The timed cut-off action of unit 104 is quite independent of the regulating function of thermocouple 20. Knob 105 initiates a cycle of operation and is reset by the clockwork action.

The operation for the production of the electret from disc 11 commences with the evacuation of chamber 23 to outlet 29 to a negative pressure of approximately one micron, as determined by an ionization gauge. The temperatures and voltages and conditions specified here refer only to a quartz disc of the stated dimensions and other values will apply for other materials and other dimensions. The space charge of the formed electret and the conditions necessary to achieve it have been measured and it is these parameters that are set down only as illustrative data and in no sense as limiting conditions. The vacuum pump 30 is kept operating and the D.C. voltage on the electrodes 21–22 is raised to twenty-five thousand volts. The crucible 10 is connected and a close check kept upon the milliammeter 27 as the temperature rises. Care should be exercised to keep the voltage below arc-over level. If ammeter 27 begins to register a quick rise arc-over may have occurred between parts 16 and 17 above the disc 11. Rheostat 26 is adjusted to decrease the effective voltage at voltmeter 28 until ammeter 27 gives a reading not in excess of two hundred fifty milliamperes. Rheostat 26 may be actuated automatically by a small servo motor controlled by milliammeter 27.

At between 750° C. and 1,000° C. the heat level is maintained constant for approximately 15 minutes. Power is then cut off from electrical connections 24 and the cooling period begun. The high D.C. voltage through connections 25 is maintained until the entire assembly has cooled to room temperature.

The furnace or heating unit necessary to raise the temperature of the electret material to the point of fusion or below, as required, may obviously be of any suitable type. While the description has been directed to a heating unit in which an arc is formed within the crucible itself, alternatively, an induction furnace or other type could be made to serve. In another variation of the process involving temperatures of fusion, the material (quartz, titanates or the like) has been ground to a particle size of five microns and blown into a high temperature flame which impinges upon a matrix. The particle stream passes through the flame and fuses and then deposits itself upon the matrix surface. As it touches the previously deposited surface, it coalesces with it. The matrix is maintained at a temperature somewhat below the temperature of fusion by the impinging flame. The polarizing high voltage is applied between the flame and the matrix until the desired dimensions of the electret have been reached, at which point the flame is cut off and a surface electrode, connected with the high voltage source, is firmly applied to the surface of the formed electret and left applied during the cooling period until room temperature has been reached.

A modification of the above process involves the simultaneous application of high pressure to the material under electrification. That is, while applying heat and high voltage to the disc 11 the blocks 16 and 17 are pressed together or the disc 11 otherwise subjected to pressure of the order of 100 kg. to 1000 kg. per square centimeter. By this means barium titanate, for example, may be treated in powder form with a particle size of five to sixty microns, in a carborundum mold corresponding to crucible 10. The face electrode plates corresponding to surfaces 14 and 19 would be made of platinum. Substances having melting points below 300° C. are preferably brought to the fluid state. In the instance of synthetic resins, such as the acrylics or those based upon fluorine, the fluid state is a specific prerequisite. The natural resins and the phenolics accept electrification at their softening points, but their capacity to hold an imposed charge is directly related to the dielectric constant of the substance utilized. The preferred material in any category should have a dielectric constant below 10.

Referring now to the application of an electret to a utility such as a particle collector in the system of which temperatures up to 300° C. may exist, the choice must lie among the ceramics, glass, quartz or the like. In one form of application of the invention to industry, it is proposed to mount an array of electrets 50, so positioned in a flue 51 or other flow point, that the array will act electrostatically to collect or to precipitate dust, fly-ash or other particles of solids which may accept an electrical charge. The electrostatic precipitator of Cottrel is well known in the art, and it is proposed to utilize the principle with modifications. The agency for the supply of the electrostatic field will be a battery of electrets 50 strategically mounted in files 52, instead of a conductor associated with a source of continuously generated high voltage.

The electret array may take the form of the illustration shown in FIGURE 2, with a multiple battery of electrets 50 suspended at a point in an air or gas flow system from which it is desired to remove fine particles. It is normal to locate electrostatic collecting systems in the flow stream following a gross form of collection by cyclone fans or the like. The form of the electret array must be such as to present a flow path maze of alternate polarity to the particles which receive a charge in their transit to the point of collection. Particles with low charge or which by virtue of their transit speed have not been captured by the first group, will be charged by contact with the field thereof and captured by succeeding groups. The number of electrets 50 in each array and the number of arrays will be determined by the particle loading density of the system. The dust particles attach themselves on the electrets 50 by virtue of the charges on each and build up a layer thereon, which eventually interferes with efficiency in the system. These particles may be removed by a vibrating or rapping device well known in the art. The electret file may be removed from the air flow during this operation and the particles drop into a hopper. Another method for removing particles from electret surfaces may be through the agency of a solvent wash into which the electret array may be periodically lowered. Alternatively, the solvent can be sprayed onto the electrets if desired, with or without moving the electret array.

One form of device utilizing electrets made by the above process in a dust collecting system is disclosed in FIGURES 2 and 3. Files 52 of electrets 50 are suspended in a housing 53 connected to flue 51 or other flow point. Housing 53 is connected to a stack or other discharge means at 54. Guide means 55 in the upper wall of top 56 or housing 53 are slotted to receive webbing or metallic surfaces 57, comprising the files 52 on which the electrets 50 are mounted. Motor drives 58 are provided for each strip 57 so they can be lowered sequentially into a cleaning chamber 59. Normally there is provided a sufficient number of files 52 so that at least one of them can be removed from action for cleaning, without unduly impairing the effectiveness of the device as a whole.

A bottom cleaning chamber 59 is provided so that files 52 of electrets 50 can be cleaned sequentially and automatically. Chamber 59 is provided with a drain 60 for the removal of the spent solvents and a hinged bottom closure 61 for the removal of solids or sludge. A series of flanged openings 62 is provided for the introduction of files 52, singly or in groups, into the chamber 59 where they pass between or against rapping or vibrating devices 63 mounted within the chamber 59.

Strips 57 have top double closure means 63 and bottom closure means 64. Closure means 63 has a peripheral flange 65 which projects above and below, as shown in FIGURE 2, for sealing against the inner side of surface 56 and to seal off opening 61 by fitting closely against the bottom of chamber 53 when the strips 57 comprising a file 52 are lowered into cleaning chamber 58. Cleaning fluid 66 is deep enough to cover all the electrets 50 but is normally well below the devices 63.

Bottom closures 64 are hinged at 67 and unbalanced so that as the strips 57 are lowered through opening 62 closures 64 pivot and align themselves with the strips 57 and pass freely by or through the devices 63. It will be noted that each motor 58 will control a dozen or more strips 57 which extend side-by-side across chamber 53. The slots 62 which permit passage of the groups of strips 57 are enough shorter than closures 63 and 64 to provide a good seal. In addition the extension of bottom closure 64 beyond the end of slot 62 serves to pivot the means 64 into sealing position against the bottom 68.

FIGURE 4 shows a schematic control circuit for the structure of FIGURE 2 in which motors 58 are connected by wires 119 across power supply 110 through a commutator arrangement comprising segments 111 in each motor circuit and a contact arm or cam 112 driven by variable speed motor 113. Rapping devices or vibrators 63 are connected in parallel with their respective motors 58 by wires 120 as shown. The speed of commutator 112 is quite slow and the length of arc of segments 111 should be so chosen as to allow ample cleaning action of the electrets 50 without keeping them out of service unduly. The speed of motor 113 is controlled by a manual rheostat 114 which may be hand-set for a given application and then maintained at an optimum by photocell 115 positioned adjacent stack 54 to check particle density in the exhaust. Amplifier 116 supplies an operating signal to servo 117 which controls fine rheostat 118 in the circuit of motor 113. It is apparent that the electret may be produced in whatever shape or dimension is dictated by the application to which it may be put. The limitations, if any, are those restrictions relating to the apparatus of production, which, involving both high voltage and high temperature, present increasing problems as the area of treatment becomes large.

It has been noted that the present invention is concerned with electrets formed from active substances free from diluents such as binders. Again, orientation on the molecular level of the electret materials removes the diluting effect of large numbers of unaligned molecules as in the case of macroscopic crystals having a plurality of domains differently aligned, wherein the best that can be achieved is the alignment of a major domain, leaving a large part of the material unaligned and acting to dilute the effectiveness of the electret in much the same manner as binder material.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end. For example, the invention comprehends making electrets by saturating active material such as cellulose fibers, with an electrically conductive solvent and evaporating the solvent in the presence of a high potential unidirectional electrical field. Asbestos fibers may be added to improve the heat resistance of the product.

I claim:

1. A process for making electrets comprising the steps of heating a mass of piezo-electric active material comprising a crystallographic structure of electro-responsively active crystals free from binder material and having a low dielectric constant and a melting point above 100° C., to a temperature just below the fusion point of said material, applying a high direct-current polarizing voltage to said material, maintaining both said high voltage and said elevated temperature for a period of time sufficient to orient the individual molecules and the individual simple crystal lattices of said material such that at least eighty percent of said molecules and said individual simple crystal lattices are polarized and aligned by said field and causing said material to cool gradually while continuing to subject said material to said high direct-current voltage during said cooling step.

2. The process set forth in claim 1 in which said material is subjected to a pressure of at least 100 kg./cm.$^2$ simultaneous with the application of heat and high voltage to said material.

3. The process set forth in claim 1 wherein said material is a ferrite.

4. The process set forth in claim 1 in which said heating step comprises feeding finely divided particles of said material through a heat zone onto a heated supporting surface, said heat zone and supporting surface being maintained at a temperature just below the temperature of fusion of said particles so that ionization occurs between said heat zone and said surface providing an electrical path for said polarizing voltage via the ionized particle path.

References Cited by the Examiner

UNITED STATES PATENTS

| | | | |
|---|---|---|---|
| 1,707,406 | 4/29 | Miquet | 204—280 |
| 1,767,265 | 6/30 | Sykes | 55—128 |
| 1,790,961 | 2/31 | Welch | 55—128 |
| 2,102,249 | 12/37 | Young et al. | 204—280 |
| 2,646,610 | 7/53 | Williams | 29—25.35 |
| 2,702,427 | 2/55 | Roberts | 29—25.35 |
| 2,706,326 | 4/55 | Mason | 29—25.35 |
| 2,724,171 | 11/55 | Wallace | 29—25.35 |
| 2,901,679 | 8/59 | Matthias | 317—262 |

WHITMORE A. WILTZ, *Primary Examiner.*

ROBERT F. BURNETT, JOHN F. CAMPBELL,
*Examiners.*